United States Patent [19]
Motoyama

[11] Patent Number: 5,299,310
[45] Date of Patent: Mar. 29, 1994

[54] FLEXIBLE FRAME BUFFER FOR RASTER OUTPUT DEVICES

[75] Inventor: Tetsuro Motoyama, Santa Clara County, Calif.

[73] Assignees: Ricoh Company, Ltd., Japan; Ricoh Corporation, San Jose, Calif.

[21] Appl. No.: 821,176

[22] Filed: Jan. 15, 1992

[51] Int. Cl.⁵ .............................................. G06F 12/02
[52] U.S. Cl. ......................................... 395/165; 395/116
[58] Field of Search ........ 395/115, 116, 162, 164–166; 358/296; 340/798–799

[56] References Cited

U.S. PATENT DOCUMENTS

| 4,467,448 | 8/1984 | Regehr et al. | 395/115 |
| 4,965,748 | 10/1990 | Chang et al. | 395/275 |
| 4,977,519 | 12/1990 | Chang et al. | 395/102 |
| 4,984,182 | 1/1991 | Chang et al. | 395/116 |

Primary Examiner—Dale M. Shaw
Assistant Examiner—Kee M. Tung
Attorney, Agent, or Firm—Flehr, Hohbach, Test, Albritton & Herbert

[57] ABSTRACT

A frame buffer for constructing a full page bit map for a raster device includes a plurality of memory cells arranged in lines and columns. The bits in the memory cells have a predetermined order, and the addresses associated with the memory cells have a linear consecutive sequence when the frame buffer is scanned out according to an originally planned direction. However, when the scan out direction is perpendicular to the originally planned direction, the predetermined bit order and the linear consecutive address sequence will not hold. The frame buffer in the invention includes mechanisms to adjust the bit order and scan out addresses when the scan out direction is perpendicular to the originally planned scan direction.

26 Claims, 13 Drawing Sheets

FIG.—4

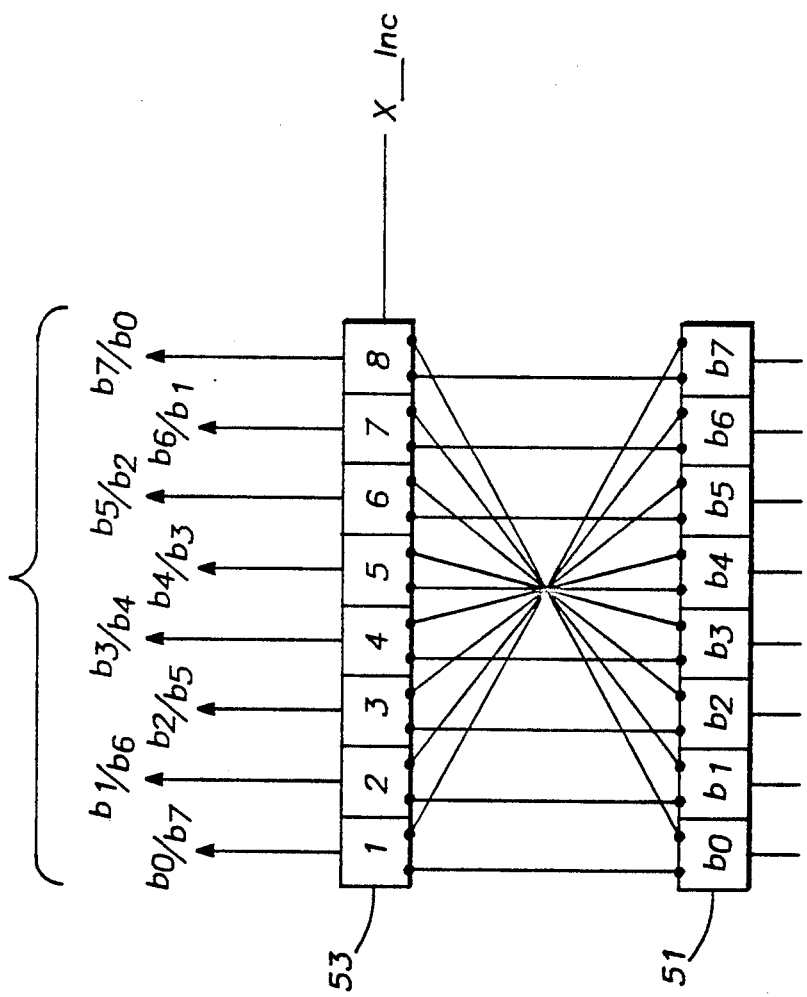
FIG.—7B

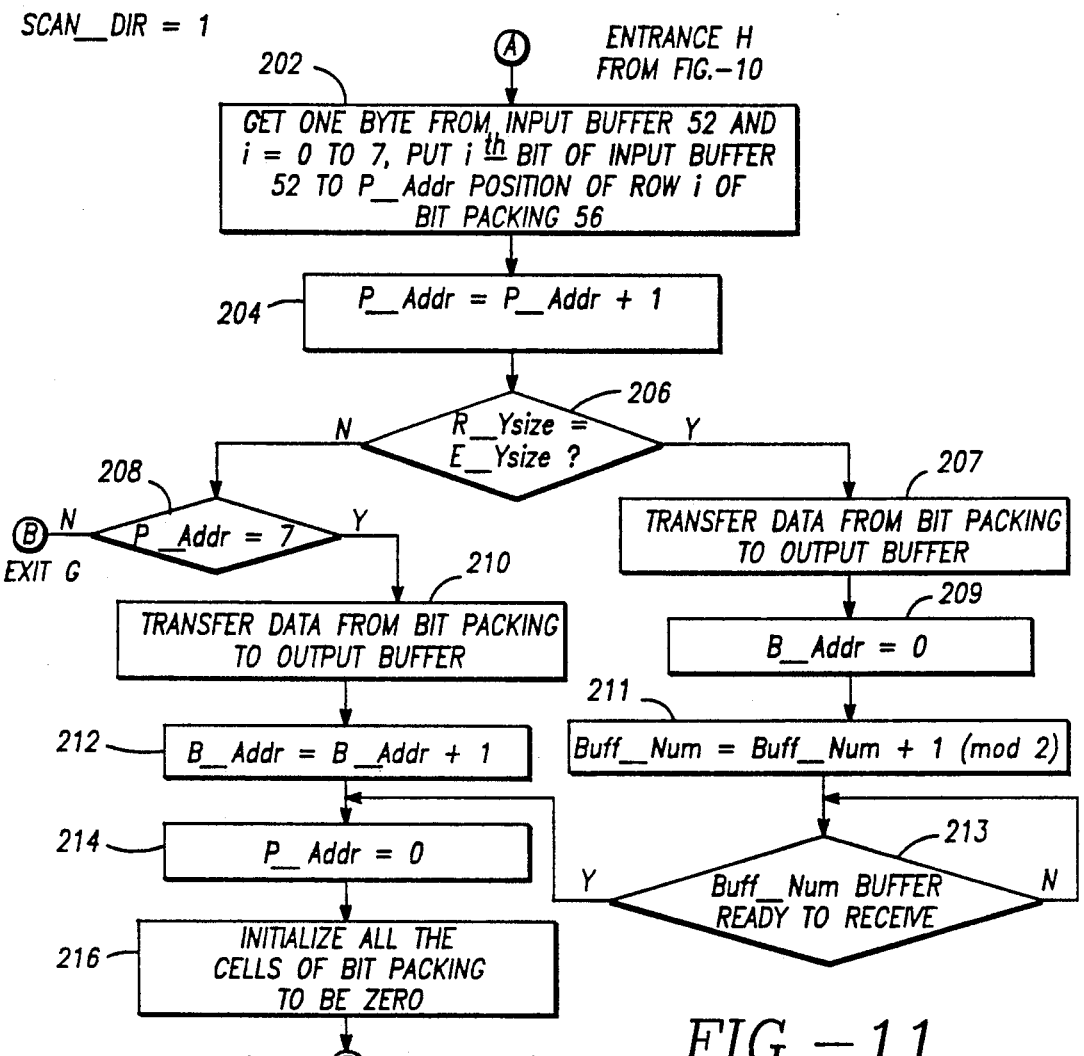
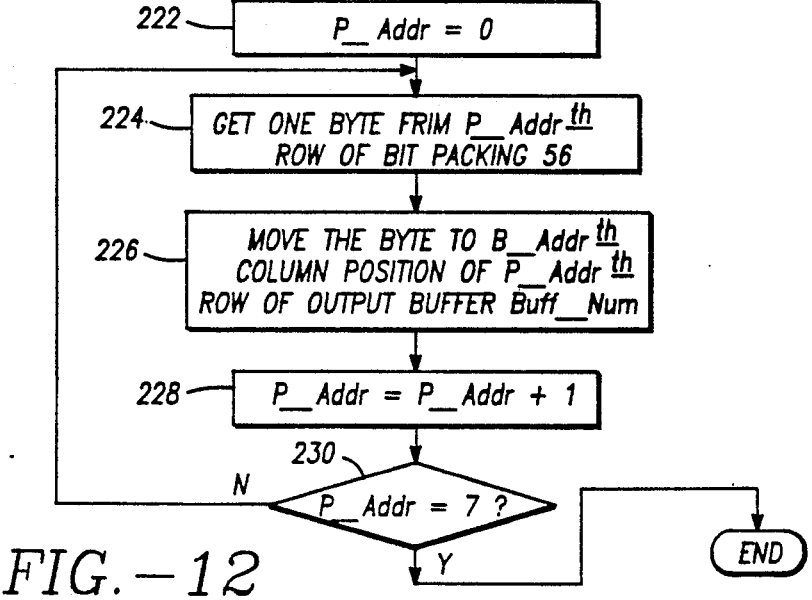
FIG.-11
FIG.-12

FLEXIBLE FRAME BUFFER FOR RASTER OUTPUT DEVICES

BACKGROUND OF THE INVENTION

This invention relates generally to a frame buffer for raster output devices, and more particularly, to a frame buffer capable of providing digital video data to a raster output device for printing a visual image.

A visual image printed on a page by a raster output device, such as a laser printer, consists of a plurality of pixels arranged as a two dimensional matrix (X dimension and Y dimension). Each of the pixels is defined as either black or white, and is processed by a host CPU. The processed pixels are then transmitted to a laser printer engine through one or more data transmission line(s). One major problem in the process of defining pixels of a page and sending the information to the printer engine is that the host CPU defines pixels at a much slower rate than that needed by the printer engine.

A solution to this synchronous process problem is to use a frame buffer (or a memory). Each of the defined pixels of a visual image is stored in a respective bit in the frame buffer. A black pixel can be defined as "0", and a white pixel as "1" (or vice versa) in the frame buffer. There are two conventional approaches involving the construction of a frame buffer. One approach is to create an entire page by using a full bit map, meaning each pixel position on the page corresponds to a bit position in the frame buffer. A second approach is to receive an entire page description from the host CPU and to create a display list. Under the second approach, the frame buffer can be smaller than full bit map depending upon the speed of creating raster data from the display list.

Since the development of Page Description Languages (PDL), such as PostScript, the number of raster devices using the full page frame buffer has increased. Because of the nature of PDL, the rasterizing controller can be simplified by using the full page frame buffer rather than the partial buffer from the display list.

Once the full page frame buffer is formed, the rasterizing controller reads the frame buffer and sends the bit pattern to the raster device. The scan direction of this frame buffer is normally fixed to accommodate the linear memory address system. This fixed scan direction does not cause any problem when the output device functions for one purpose, such as either printing or copying.

However, the recent trend to add more functions on one device causes an additional demand to deal with the scanning of the full page frame buffer. For example, Ricoh has announced a digital copier which can function as a copier and a printer. As a copier, a user can change the input paper trays easily. In addition, the digital copier has different input trays available for the user. Letter-size paper can have a short edge-first paper tray and a long edge-first tray. Under certain conditions, the image constructed in the frame buffer may not match the paper's available configuration, for example, when the page image is constructed for the short edge-first tray, and the paper is available only from the long edge-first tray. Such a case can occur when the user interrupts the print job, physically changes the tray, and copies several pages from the long edge tray. Under such a condition, the created image in the frame buffer must be scanned with a scan direction different from the originally planned scan direction.

There are various conventional approaches which deal with transposing the frame buffer. For example, in one conventional approach, in order to change from a short edge paper tray to a long edge paper tray, the entire frame buffer is rotated 90° to allow linear scanning of the frame buffer. The problem with this approach is that it is appropriate only when the frame buffer dimension is small. When the resolution of raster device is fine, such as 600 dots per inch (DPI), the full page frame buffer consists of approximately 4 Mega bytes for a bi-level (black and white) device. The memory size will be much larger for the color or gray scale devices of the higher resolution. Therefore, the 90 degree rotation for such a high resolution takes too much time and requires more memory resources.

Chang et al. (U.S. Pat. Nos. 4,965,748; 4,977,519; 4,984,182) uses a flexible frame buffer. However, their scan direction of the frame buffer is fixed.

Motoyama, et al. ("Method for Controlling the Buffer Scan and Placing the Origin of the Buffer", U.S. Ser. No. 07/379,019) describes a flexible method to define the output image dimension once the image is formed in the full page frame buffer. However, the scan direction of the buffer is fixed.

SUMMARY OF THE INVENTION

Accordingly, it is an objective of this invention to provide an improved full page frame buffer.

It is another objective of this invention to provide a cost effective apparatus and method to allow the scanning of the full page frame buffer both in the original planned scan direction and in a direction perpendicular to the original scan direction.

It is yet another objective of this invention to provide a cost effective apparatus and method to transpose the frame buffer with fast speed.

In one respect, this invention provides an apparatus for constructing a full page bit map for a raster device. The apparatus includes a frame buffer, a direction indicating means and a scan address generating means. The frame buffer includes a plurality of memory cells, which are arranged as a matrix consisting an X dimension and a Y dimension. The frame buffer can be scanned in a first scan direction and a second scan direction, and the memory cells have a consecutive linear address sequence when they are scanned in accordance with said first scan direction. The direction indicating means generates a first direction signal to indicate said first scan direction, and a second scan direction signal to indicate said second scan direction. The scan address generating means generates scan addresses for the first scan direction in response to the first scan direction signal, and generates scan addresses for the second scan direction in response to the second scan direction signal.

In the frame buffer, each of the memory cells has n bits, and all bits in said memory cells have a predetermined bit order corresponding to said first scan direction. The apparatus further includes an adjusting means for adjusting the bit order in response to the second scan direction.

In another aspect, the invention provides a method for use with a frame buffer means for constructing a full page bit map for a raster device. The frame buffer means includes a matrix of memory cells, which consists lines along an X dimension and columns along a Y dimension. The frame buffer can be scanned in a first scan direction and a second scan direction, and the memory cells have a consecutive linear address sequence when they are scanned in accordance with the first scan direction. The method for scanning said frame buffer comprising the steps of: 1) generating a first direction signal to indicate the first scan direction, and for generating a second scan direction signal to indicate the second scan direction; and 2) generating scan addresses for the first scan direction in response to the first scan direction signal, and generating scan addresses for the second scan direction in response to said second scan direction signal.

In the frame buffer, the X dimension has an X size and said Y dimension has a Y size. Each of the memory cells has n bits, and all bits in the memory cells have a predetermined bit order corresponding to the first scan direction. The method further comprises the step of adjusting said bit order in response to said second scan direction.

BRIEF DESCRIPTION OF THE DRAWINGS

The purpose and advantages of this invention will be apparent to those skilled in the art from the following detailed description in conjunction with the appended drawings, in which:

FIG. 7B shows the hardware block diagram of the Bit Order Adjustment Controller shown in FIG. 2.

FIGS. 9 through 12 show the flow chart of the operation of the present invention.

DETAILED DESCRIPTION OF DRAWINGS

The present invention comprises a novel structure of a frame buffer for constructing a full bit map and associated method. The following description is presented to enable any person skilled in the art to make and use the invention, and is provided in the context of a particular application and its requirements.

Figure 1:
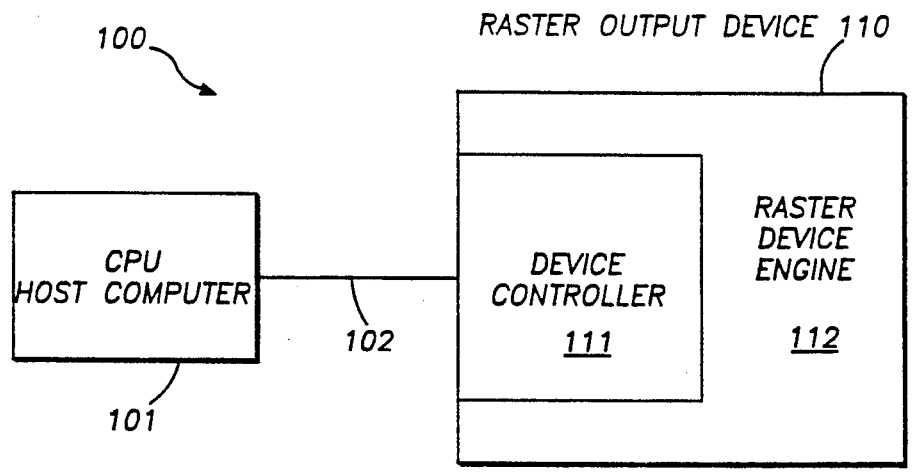
FIG. 1 shows the overall system configuration.

Referring to FIG. 1, there is shown an overall system configuration 100. Through bus 102, host CPU 101 is connected to device controller 111 which controls and activates raster device engine 112. Device controller 111 can be located either inside or outside the raster device engine. Host CPU 101 is responsible for generating and sending the data to be printed on a page. Device controller 111 receives the data and generates the image data in a frame buffer (not shown in FIG. 1). Then, device controller 111 activates raster device engine 112 according to the image data stored in the frame buffer.

Figure 2:
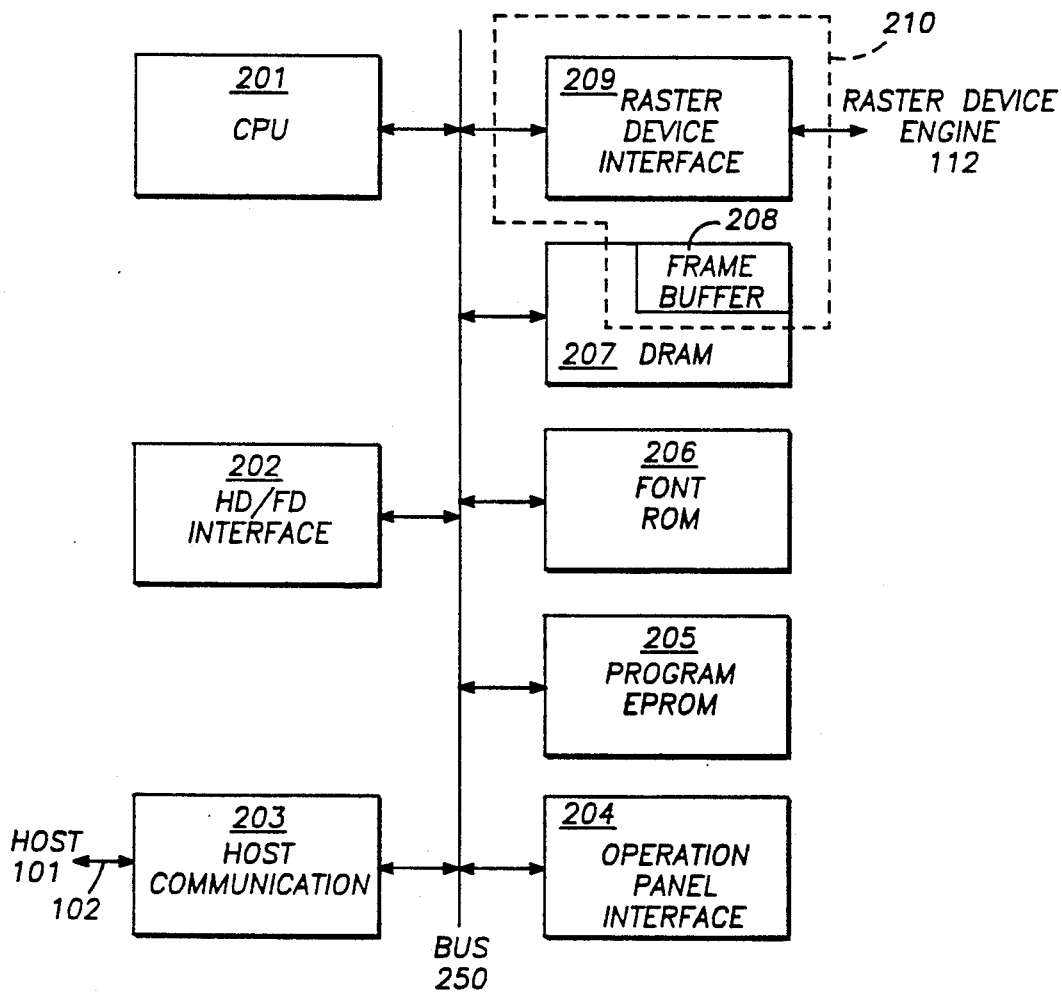
FIG. 2 shows the hardware function block diagram of the Device Controller shown in FIG. 1.

Referring to FIG. 2, there is shown a hardware functional block diagram of device controller 111 shown in FIG. 1. The device controller includes a local CPU 201, a host communication 203, an operation panel interface 204, a program EPROM (or ROM) 205, a font ROM 206, a DRAM 207, a frame buffer 208, a raster device interface 209 and a local bus 250. Via local bus 250, local CPU 201 is connected to the other components. Host CPU 101 (shown in FIG. 1) is coupled to host communication 203 via bus 102. Host CPU generates printer commands such as PostScript to describe pages and send them to device controller 111. CPU 201 then interprets the printer commands and generates the page image stored in frame buffer 208.

Figure 3:
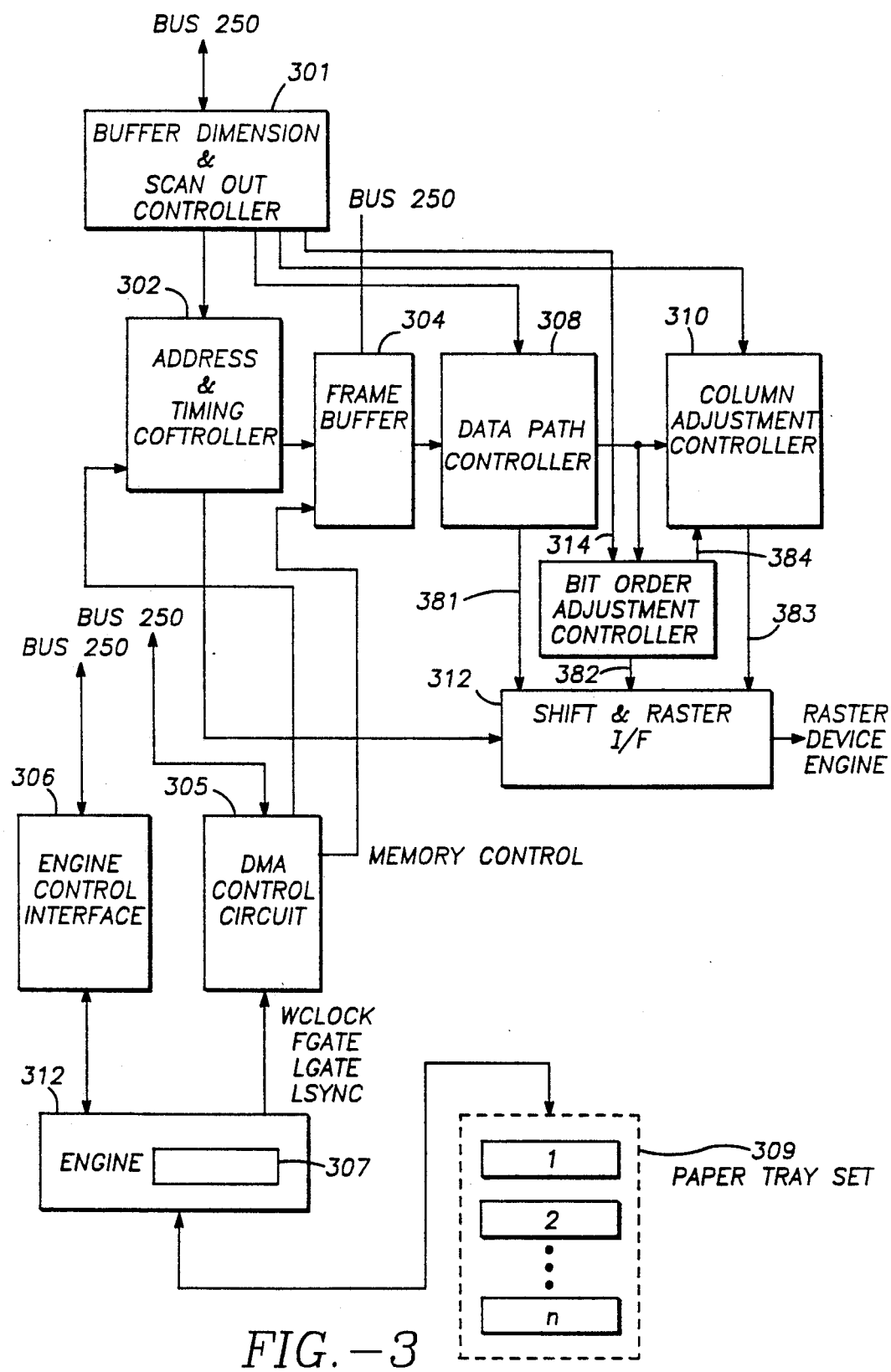
FIG. 3 shows the hardware function block diagram of the Raster Device Interface and the Frame Buffer shown in FIG. 2.

Referring to FIG. 3, there is shown the functional block diagram of raster device interface 209 and frame buffer 208 (shown in FIG. 2). Buffer dimension and scan out controller 301 provides control signals suitable for different scan directions and scan sequences. Frame buffer 304 stores processed pixels to construct a full bit map. Data path controller 308 receives the data from frame buffer 304 and transmits the data to shift and raster I/F 312 via four different paths. If the scan direction is the same as the originally planned direction and the scan sequence in the X dimension is from left to right, data path controller 308 directly transmits the data from frame buffer 304 to shift and raster I/F 312 via 381. If the scan direction is the same as the originally planned direction and the scan sequence in the X dimension is from right to left, data path controller 308 first transmits the data from frame buffer 304 to bit order adjustment controller 314; the bit order adjustment controller then transmits the data to shift and raster I/F 312 via path 382. If the scan direction is perpendicular to the originally planned direction and the scan sequence in the X dimension is from left to right, data path controller 308 first transmits the data from frame buffer 304 to column adjustment controller 310; the column adjustment controller then transmits the data to shift and raster I/F 312 via path 383. If the scan direction is perpendicular to the originally planned direction and the scan sequence in the X dimension is from right to left, data path controller 308 first transmits the data from frame buffer 304 to bit order adjustment controller 314; the bit order adjustment controller then transmits the data to column adjustment controller 310 via 384; the column adjustment controller finally transmits the data to shift and raster I/F 312 via path 383. DMA control circuit 305 controls direct memory access to frame buffer 304. Address and timing controller 302 provides address and timing signals for frame buffer 304, DMA control circuit 305, and shift and raster I/F 312. Engine control interface 306 is responsible for exchanging information, such as control signals and the engine status, between device controller 111 (shown in FIG. 1) and raster device engine 112. In the present invention, raster device engine 112 includes circuit 307 for sending the information related to paper tray set 309, such as the selected paper input tray becomes empty, and the active paper input tray has been changed. Such information can be fed to buffer dimension and scan out controller 301 to determine scan out schedule. Through engine control interface 306 and bus 205, the device controller can also select the different input trays, inquire the available paper trays in paper tray set 309. The device controller can change the scan direction if the selected paper tray requires the different scan direction.

Figure 4:
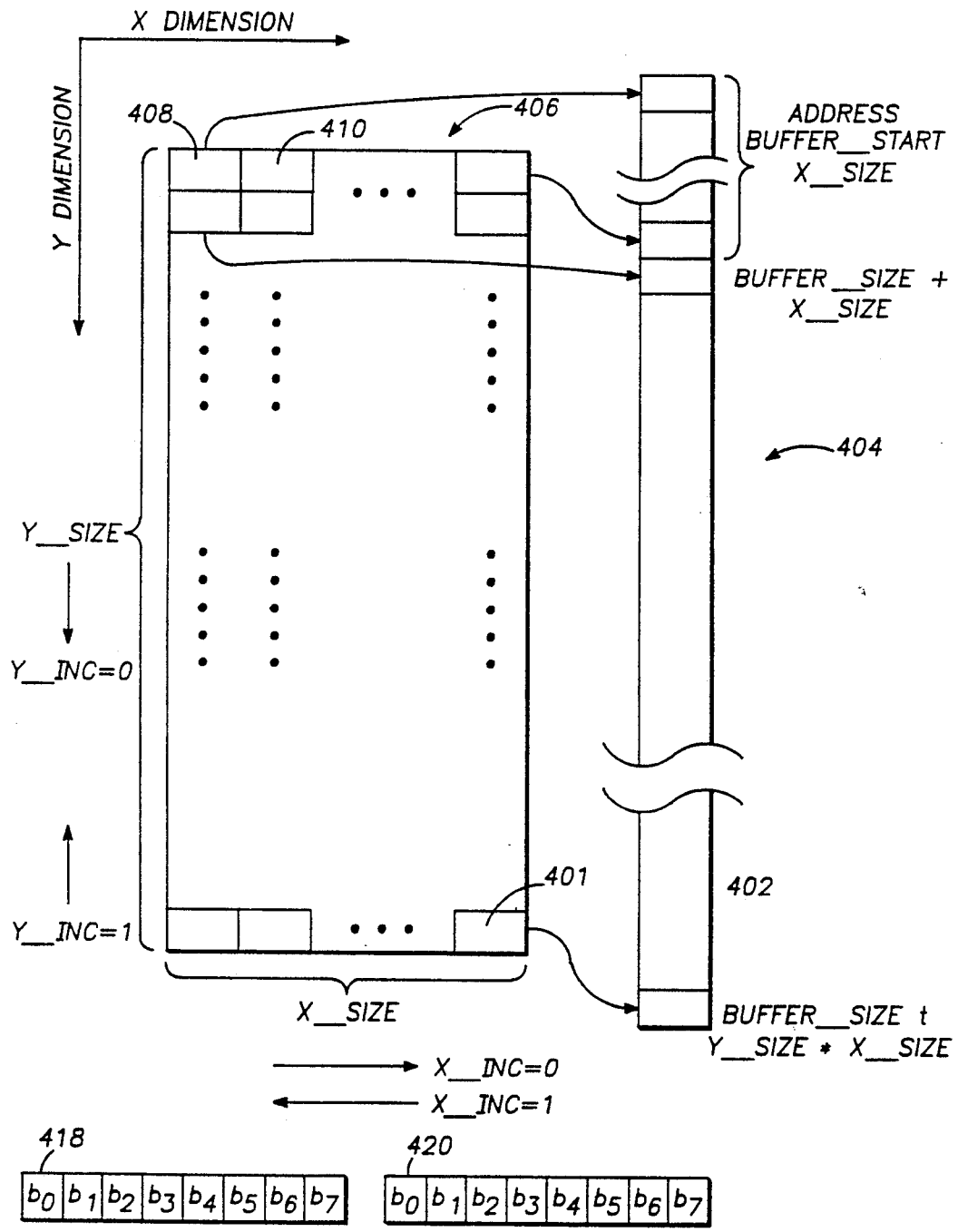
FIG. 4 shows in more detail the Frame Buffer shown in FIG. 3.

Referring to FIG. 4, there is shown an embodiment of frame buffer 304 (shown in FIG. 3). The frame buffer can be considered as a frame buffer matrix 406, including a plurality of memory cells arranged in lines and columns. X_Size represents the total number of memory cells in each line, and Y_Size represents the total number of lines in the frame buffer matrix. The memory cells aligned along the Y dimension form a column. Each of the memory cells associates with a unique address. The memory addresses have a consecutive sequence according to the originally planned scan direction. This means that, when the memory cells in the frame buffer are scanned out line by line from the top to the bottom, and when the memory cells in a same line are scanned out from left to right, the two dimensional addresses become a linear consecutive address stack (404 as shown in FIG. 4).

The corresponding relationship between the addresses in frame buffer matrix 406 and the addresses in stack 404 can be illustrated by using a specific example. Suppose that the first memory cell to be scanned out defined by the Buffer Start Address happens to be the physical first memory cell 408 in the first line, and the last memory cell to be scanned out defined by the Buffer End happen to be the physical last memory cell 401 in frame buffer matrix 406. Further suppose that there are n memory cells (X_Size) in each line and k memory cells (Y_Size) in each column. Then, the first memory address in the first line is located at the first position of the address stack, and the last address in the first line is located at the nth position of the address stack. The first address in the second line is located at the (n+1)th position of the address stack, and the last memory address in the second line is located at the (2*n)th position. The first memory address in the last line (kth line) is located at the [(k−1)*n+1]th position in the address stack, and the last memory address in the last line is located at the (k*n)th position in the address stack. The corresponding address relationship under these assumptions can be generalized as: the first address in the $i^{th}$ line is located at the [(i−1)*n+1]th position of the address stack, and the last memory address in the $i^{th}$ line is located at the (i*n)th position. Each of the memory cells in the frame buffer matrix typically has 8 bits (a byte), with an order b0b1b2b3b4b5b6b7 from left to right. Memory cells 418 and 420 at the bottom of FIG. 4 show the detailed structures of memory cells 408 and 410 in the frame buffer matrix respectively. Thus, according to the originally planned scan direction, the scan out order for all bits in the frame buffer matrix has an order b0b1b2b3b4b5b6b7, b0b1b2b3b4b5b6b7, . . . , b0b1b2b3b4b5b6b7.

However, when the scan out direction does not comply with the originally planned direction (for example, when the scan direction is perpendicular to the originally planned direction, which will entail scanning the frame buffer column by column), such a linear address sequence and bit order will not hold. Moreover, in order to increase the scan out speed, it is sometimes desirable to scan out only part of the lines and columns. The present invention provides the apparatus and method to remedy these two problems.

Figure 5:
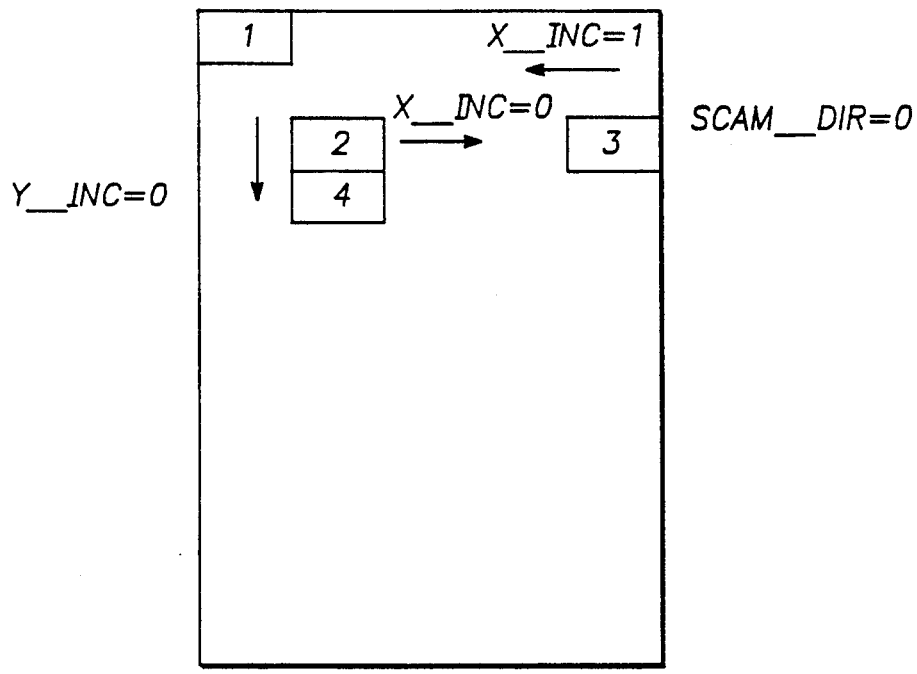
FIG. 5 shows the scan out case where the scan direction is the same as the originally planned direction.

Referring to FIG. 5, there is shown the scan out case where the scan direction indicated by Scan_Dir is the same as the originally planned direction. When the Scan_Dir is "0", the frame buffer is scanned out line by line. Within a line, there are two scan out sequences along the X dimension. If X_Inc is "0", the scan sequence along the line is from left to right. If X_Inc is "1", the scan sequence along the line is from right to left. When X_Inc is "1", the output is the mirror image of the constructed image. In FIG. 5, corresponding to the "0" value of X_Inc, the line start address (Line_Start_Addr) is the address associated with memory cell 2; corresponding to the "1" value of X_Inc, the line start address is the address associated with memory cell 3.

Figure 6:
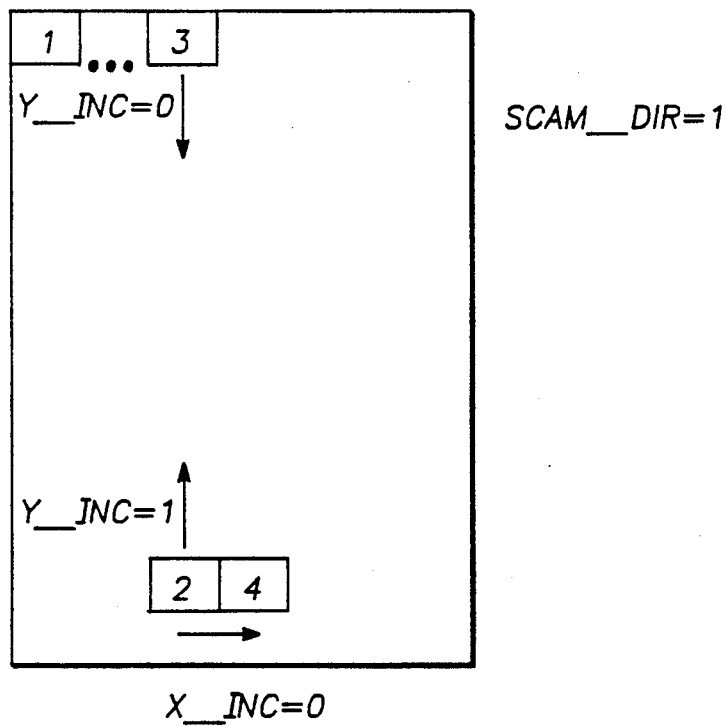
FIG. 6 shows the scan out case where the scan direction is perpendicular to the originally planned direction. The memory addresses for the read-out are no longer consecutive.

Referring to FIG. 6, there is shown the case where the scan direction indicated by Scan_Dir is perpendicular to the originally planned direction. When the Scan_Dir is "1", the frame buffer is scanned out column by column. Within a column, there are two scan out sequences along the Y dimension. If Y_Inc is "0", the scan sequence along the column is from the top to the bottom; if Y_Inc is "1", the scan sequence along the column is from the bottom to the top. In FIG. 6, corresponding to the "0" value of Y_Inc, the column start address (Col_Start_Addr) is the address associated with memory cell 3; corresponding to the "1" value of Y_Inc, the column start address is the address associated with memory cell 2.

It should be noted that, when the scan direction is perpendicular to the originally planned direction, the memory addresses in the frame buffer for read out are no longer consecutive. Moreover, when X_Inc is "1", or Scan_Dir is "1", the original bit order (b0b1b2b3b4b5b6b7) will not be suitable for the scan out operation.

Figures 1, 7A:
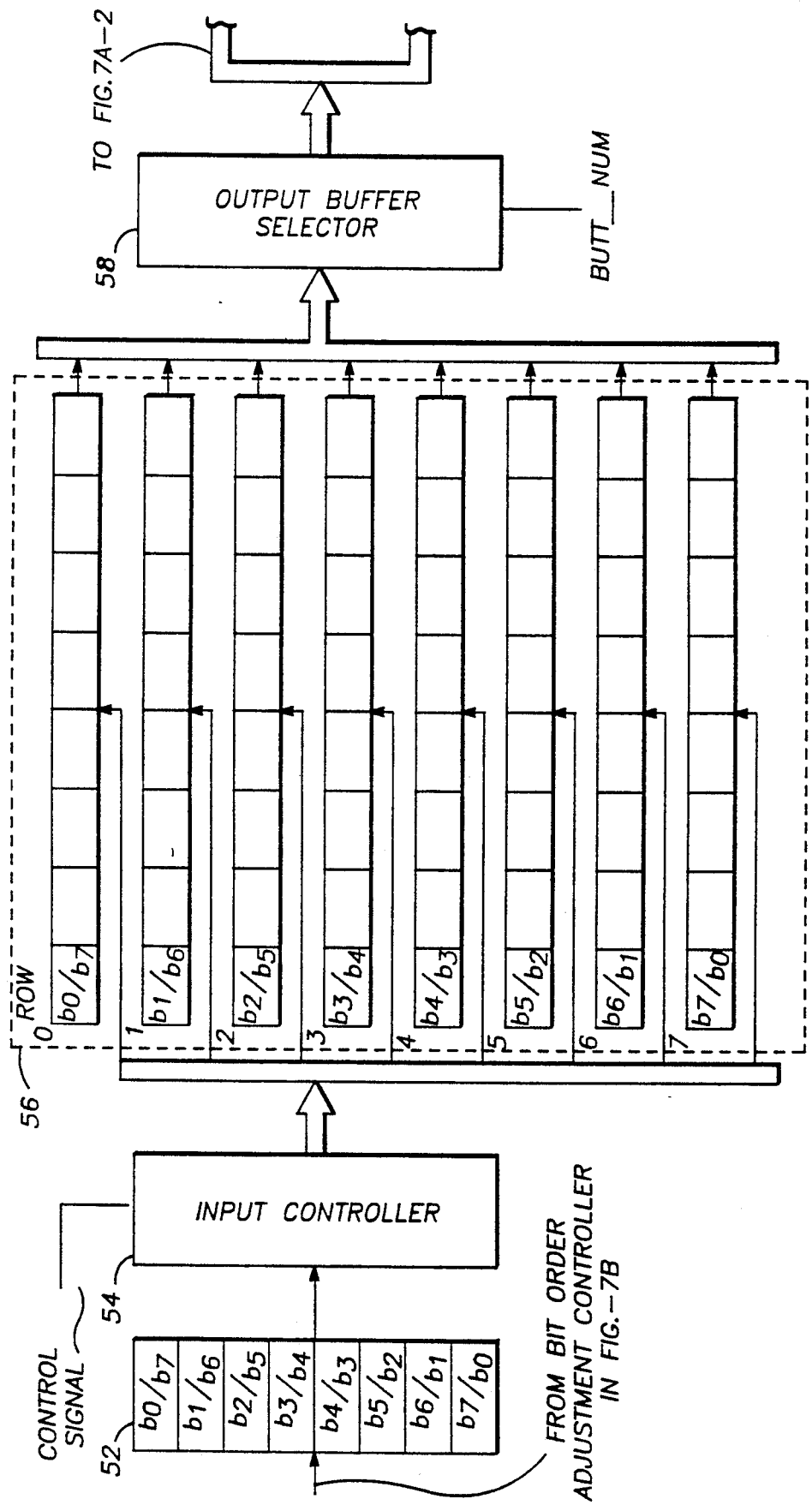
FIG. 7A shows the hardware block diagram of the Column Adjustment Buffer shown in FIG. 2.
Figures 2, 7A:
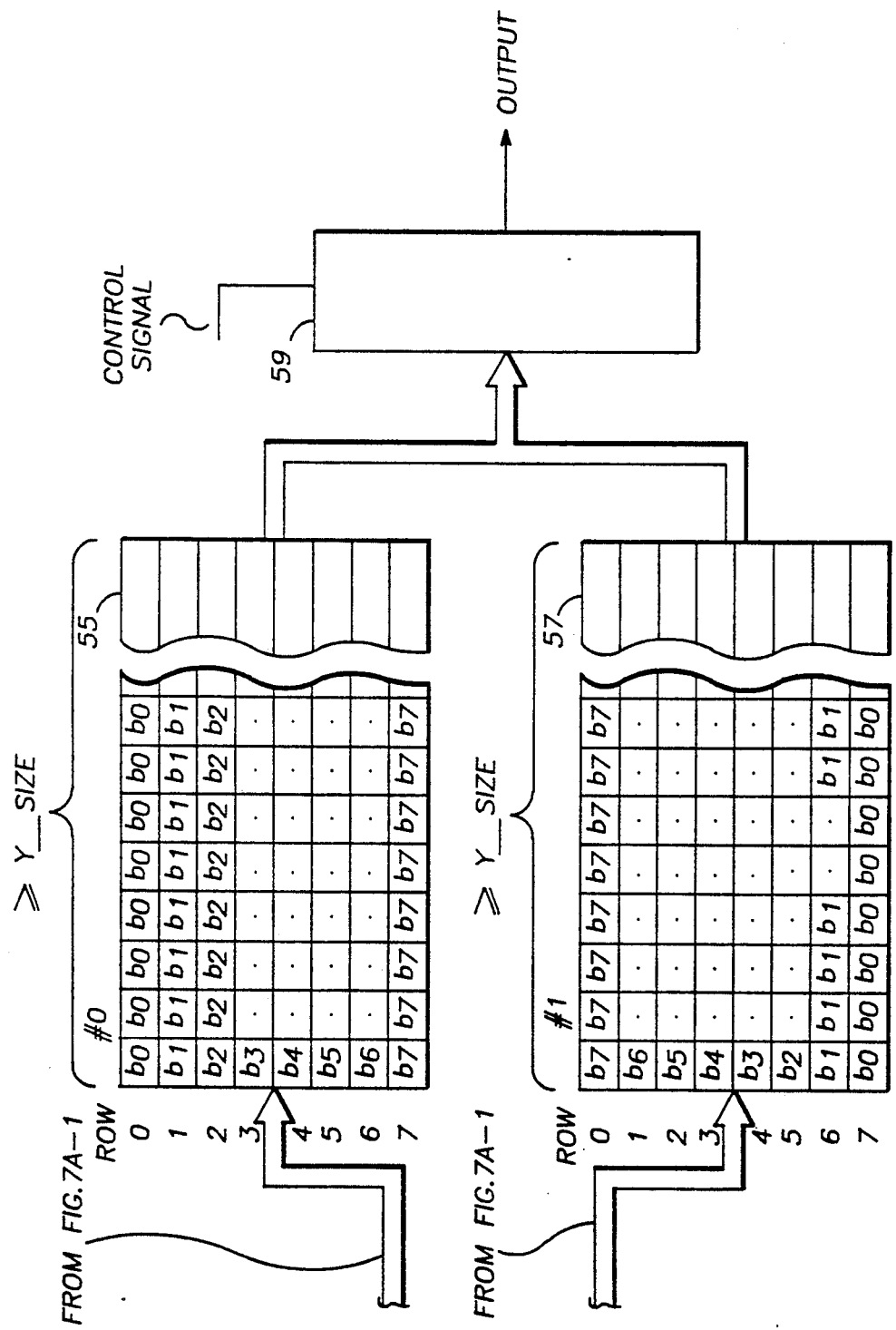

Referring to FIG. 7A, there are shown some details of column adjustment controller 310 (shown in FIG. 3). The column adjustment controller includes input buffer 52, input controller 54, bit packing 56, bit order controller and output buffer selector 58, output buffer 55 (#0) and output buffer 57 (#1), and output controller 59. Input buffer 52 receives data from bit order adjustment controller 314 (shown in FIG. 3) and provides the data to input controller 54. The bit order adjustment controller can provide bytes in two different orders, b0b1b2b3b4b5b6b7 or b7b6b5b4b3b2b1b0, depending on scan sequences in the X dimension. Bit packing 56 has a plurality of rows. The number of rows in the bit packing should match the number of bits in each of the memory cells in the frame buffer. In this embodiment, the bit packing has 8 rows numbered from 0 to 7, because each memory cell in the frame buffer has eight bits. Input controller 54 transfers 8 bits from input buffer 52 into the same bit positions in different rows of bit packing 56. For example as shown in FIG. 7A, the bits with the order of b0b1b2b3b4b5b6b7 (or with the order of b7b6b5b4b3b2b1b0) in input buffer 52 can be transferred into the first bit positions of rows 0-7 respectively. Thus, when the scan sequence is from left to right, row 0 of bit packing 56 contains only eight b0 bits (the bits in the first bit positions of eight memory cells in the frame buffer); when the scan sequence is from right to left, row 0 of bit packing 56 contains only eight b7 bits (the bits in the eighth bit positions of eight memory cells in the frame buffer). This means that the bit order in the frame buffer are rotated 90 degrees or 270 degrees in the bit packing.

The number of the rows in each of the output buffers should also match the number of bits in each of the memory cells in the frame buffer. Thus, each of the output buffers also contains 8 rows from 0-7. In order to hold all bits in a column, the memory size of the output buffers in each row should at least equal the Y_Size of the frame buffer. Inside of output buffer #0 and output buffer #1, there is shown the structure of the first memory cell in each of the 8 rows. The bit order in output buffer #0 shows the situation where scan sequence in the X dimension is from left to right; and the bit order in output buffer #1 shows the situation where scan sequence in the X dimension is from right to left. Output buffer selector 58 selects output buffer #0 and output buffer #1 in response to control signal Buff_num.

Referring to FIG. 7B, there is shown one embodiment of bit order adjustment controller 314 (shown in FIG. 3). Register 51 receives the data from the frame buffer as the original bit order and provides two sets of outputs to gate 53 which has 8 channels. Each of the 8 channels of gate 53 has two inputs. In one set of the two outputs from register 51, b0b1b2b3b4b5b6b7 are connected to the eight channels 1-8 respectively. In another set of the two outputs from register, b0b1b2b3b4b5b6b7 are connected to channels 8-1 respectively. Thus, in response to X_Inc, gate 53 can provide outputs in two different orders: b0b1b2b3b4b5b6b7 or b7b6b5b4b3b2b1b0. This means that, when X_Inc is "1", the bits in each memory cell of the frame buffer are rotated 180 degrees.

Figure 8A:
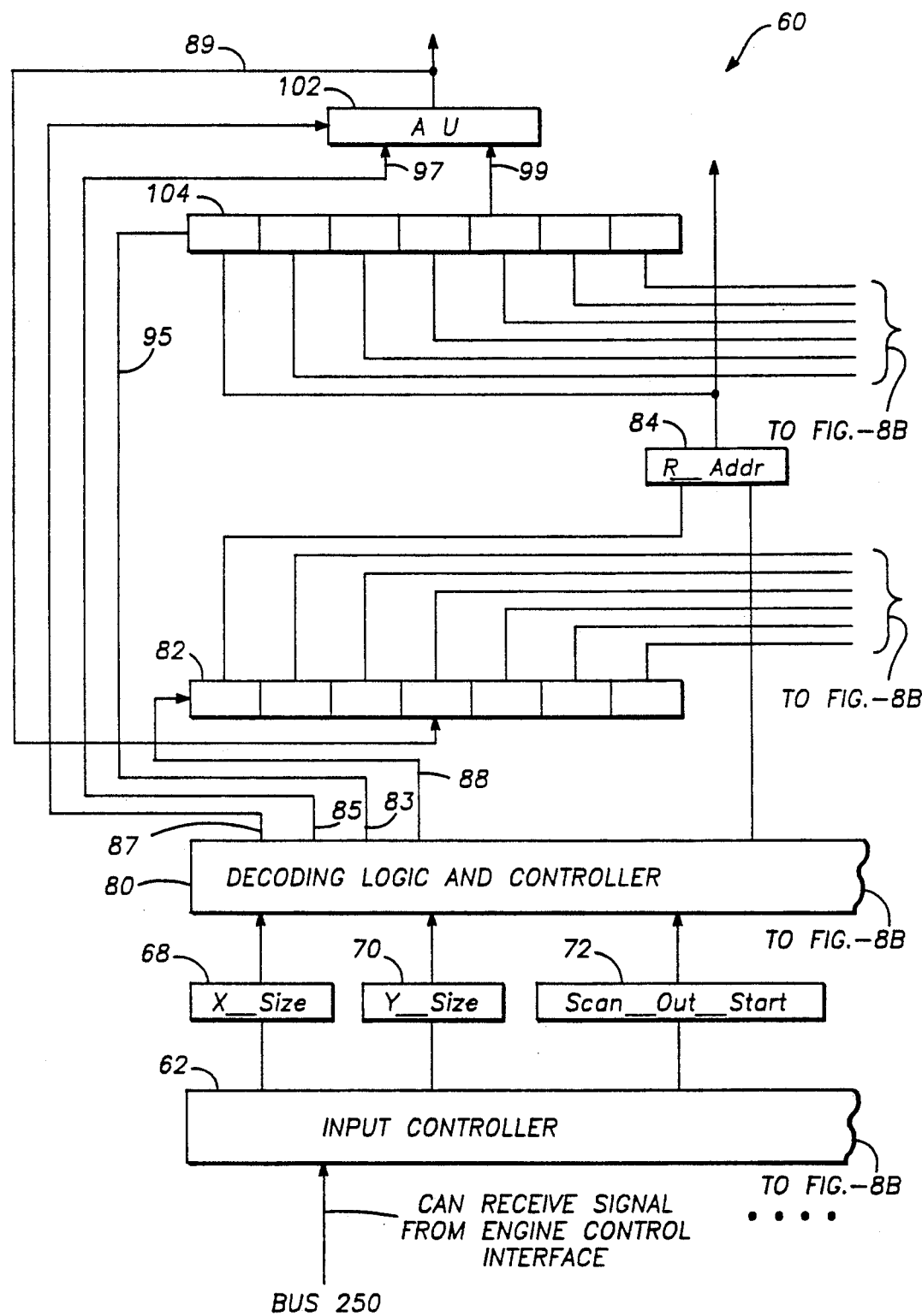
FIG. 8 shows the hardware block diagram of the Buffer Dimension and Scan Out Controller shown in FIG. 3.
Figure 8B:
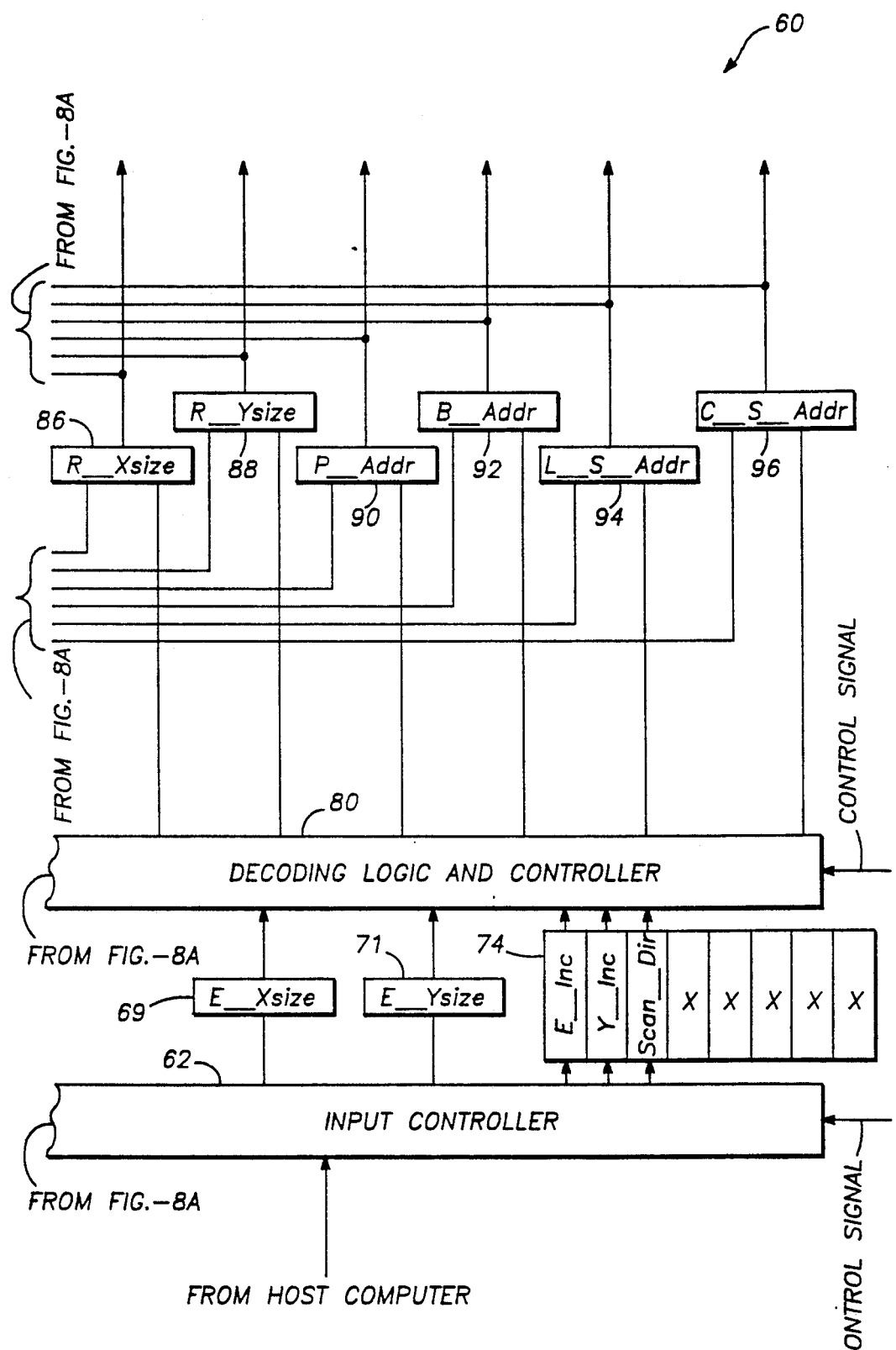

Referring to FIG. 8, there is shown the functional block diagram of buffer dimension and scan out controller 301 (shown in FIG. 3). Scan register 74 has 8 bits. Bit X_Inc indicates the scan sequence along the X dimension of the frame buffer, bit Y_Inc indicates the scan sequence along the Y dimension of the frame buffer, and bit Scan_Dir indicates the scan direction. The remaining 5 bits in scan register 74 are undefined. X_Size register 68 and Y_Size register 70 indicate X size and Y size of the frame buffer respectively. Scan_Out_Start register 72 indicates the start address to be scanned out in the frame buffer. It should be noted that the start address to be scanned out may not equal to the physical start address of the frame buffer. The E_Xsize register 69 indicates the number of memory cells which should be scanned out in a line, and E_Ysize register 71 indicates the number of lines which should be scanned out in the frame buffer. The values in these six registers are kept constant during the scan out operation.

R_Addr register 84 indicates the current read out address in the frame buffer. R_Xsize register indicates the number of memory cells that have been read out in a line, and R_Ysize register 88 indicates the number of memory cells that have been read out in a column. P_Addr register 90 is used to indicate both bit positions and row positions of bit packing 56 (shown in FIG. 7A). The P_Addr register is also used to indicated the row positions in output buffer #0 and output buffer #1. B_Addr register 92 indicates the column positions in output buffers 55, 57 (shown in FIG. 7A). L_S_Addr register 94 and C_S_Addr register 96 indicate scan line start address and scan column start address respectively of the frame buffer.

The values in registers 84, 86, 88, 90, 92, 94, 96 are updated during the scan out operation, based on the information provided by registers 68, 69, 70, 71, 72 and 74. Arithmetic unit (AU) 102 is responsible for updating the values for registers 84, 86, 88, 90, 92, 94, and 96 during the scan out operation. The outputs of the seven registers are connected to gate 104, which has 7 channels, and the output of gate 104 is connected to input 99 of AU 102. Thus, under the control of decoding logic and controller 80, via line 95, each of the outputs of the seven registers can be selectively connected to input 99 of AU 102. Decoding logic and controller 80 provides another input to input 97 of AU 102. The values of the input on line 97, depending on the stages of the scan out operation, can be +1, −1, +X_Size or −X_Size. The meaning of the values will be explained in flow chart shown in FIGS. 9-12. The output of the AU is connected to gate 82, which has 7 output channels. The seven outputs of gate 82 are connected to the seven inputs of registers 84, 86, 88, 90, 92, 94, 96, respectively. Thus, under the control of decoding logic and controller 80, via line 81, the result of the AU can be selectively fed back to the seven registers.

Figure 9:
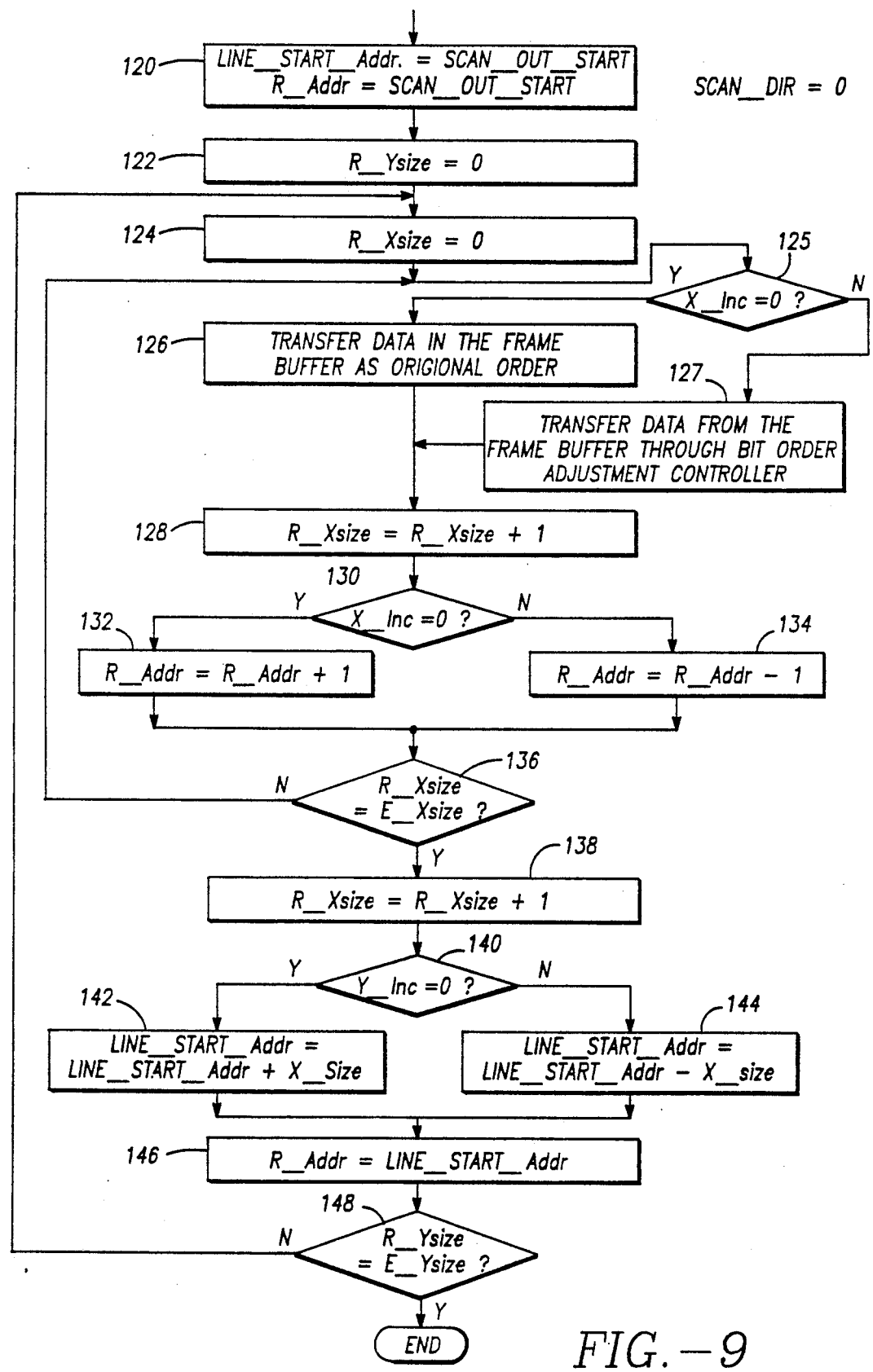
Figure 13:
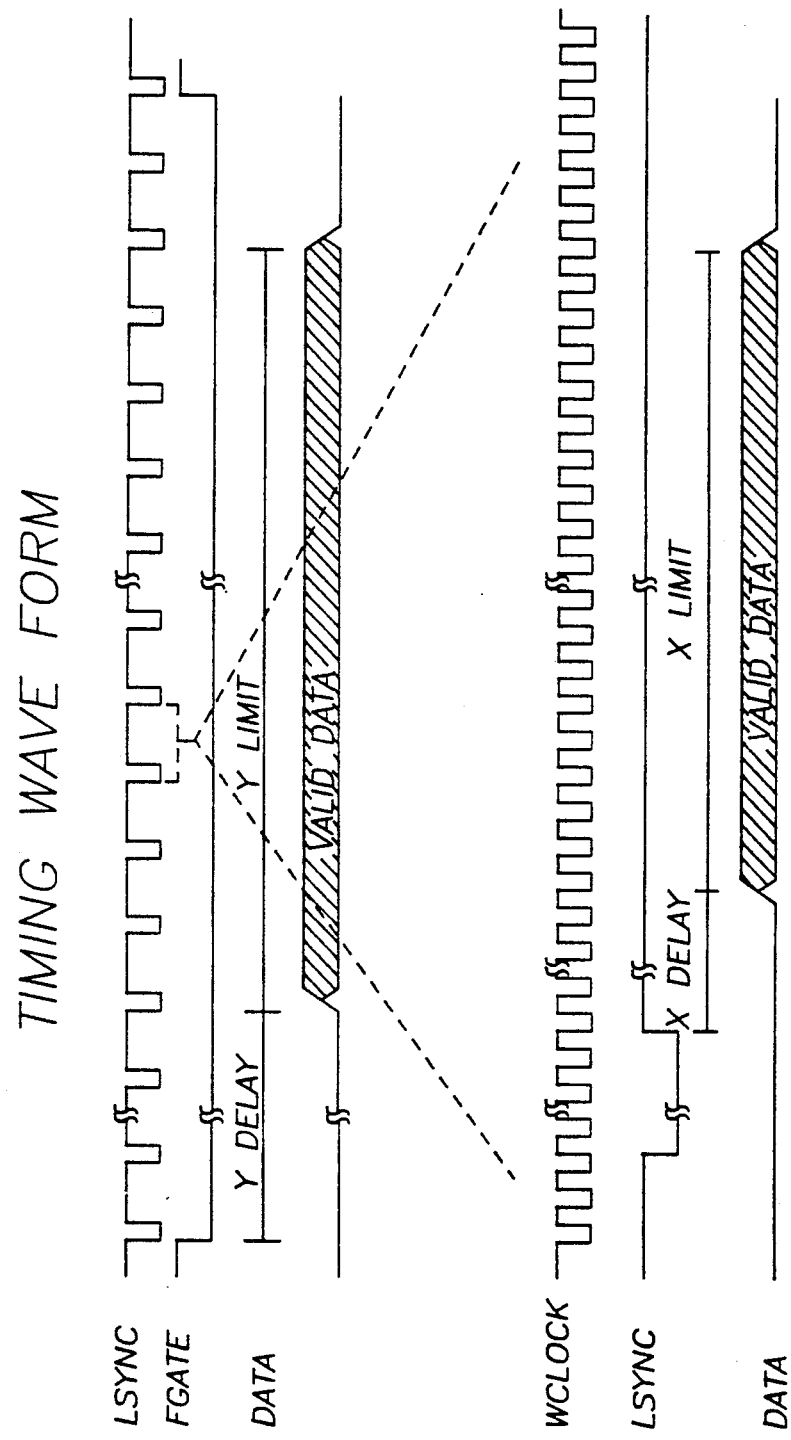
FIG. 13 shows some of the timing signals for the scan out operation.

Referring to FIG. 9, there is shown a flow chart of the scanning operation, where the scan direction is the same as the originally planned scan direction. At the beginning of the scan out operation, the values of both Line_Start_Addr Register 94 and R_Addr register 84 (shown in FIG. 8) are set equal to the value of Scan_Out_Start register 72 (shown in FIG. 8) in step 120, and the values of R_Ysize register 88 and R_Xsize register 86 (shown FIG. 8) are set equal to 0 in steps 122 and 124, respectively. In order to decide the scan sequence along the X dimension, step 125 tests the value of X_Inc (shown in FIG. 8). If the value of X_Inc is "0", then in step 126 the data in the frame buffer is transferred as the original bit order to shift & raster I/F 312 (shown in FIG. 3) from the memory cell indicated by the R_Addr register. If the value of X_Inc is "1", then in step 127 the data in the frame buffer is rotated 180 degrees through line adjustment controller 314 (shown in FIG. 3), and transmitted to the shift & raster I/F. After the data is transferred out of the memory cell, the value in the R_Xsize register increases by 1 in step 128. The first read out sequence is synchronized with FGATE, LSYNC and WCLOCK signals as shown in FIG. 13. Then, step 130 tests the value of the X_Inc. If the value of the X_Inc is "0", then the value of the R_Addr register increases by 1, because the scan out sequence in a line is from left to right. If the value of the X_Inc is "1", then the value of the R_Addr register decreases by "1", because the scan out sequence in the line is from right to left. In step 136, the value of R_Xsize register 86 (shown in FIG. 8) is compared with the value of E_Xsize register 69 (shown in FIG. 8). If the value of the R_Xsize register is not equal to the value of the E_Xsize register, the operation goes back to step 125 to read the next memory cell in the same line, because the line has not been scanned out. If the value of the R_Xsize register is equal to the value of the E_Xsize register (or next LSYNC signal shown in FIG. 13 is received from engine 112 shown in FIG. 3 via interrupt), then the value of R_Ysize register 88 (shown in FIG. 8) increases by 1 in step 138, because the line has been scanned out. In order to decide the first address in the next line, step 140 tests the value of Y_Inc register 74 (shown in FIG. 8). If the value of the Y_Inc register is "0", meaning that the scan out sequence along the Y dimension is from the top line to the bottom line, the value of Line_Start_Addr register 94 (shown in FIG. 8) increases by X_Size in step 142. If the value of the Y_Inc register is "1", meaning that the scan out sequence along the Y dimension is from the bottom line to the top line, the value in the Line_Start_Addr register decreases by X_Size in step 144. In step 146, the value of the R_Addr register is set equal to the value of the Line_Start_Addr register (in which the first address for the next line is stored). In step 148, the value of the R_Ysize register is compared with the value of E_Ysize register 71 (shown in FIG. 8). If the value of the R_Ysize register is not equal to the value of the E_Ysize register, the scanning operation goes back to step 124 to scan the next line. If the value of the R_Ysize register is equal to the value of the E_Ysize register (or FGATE signal shown in FIG. 12 changes), the scanning operation for the frame buffer is completed.

Figure 10:
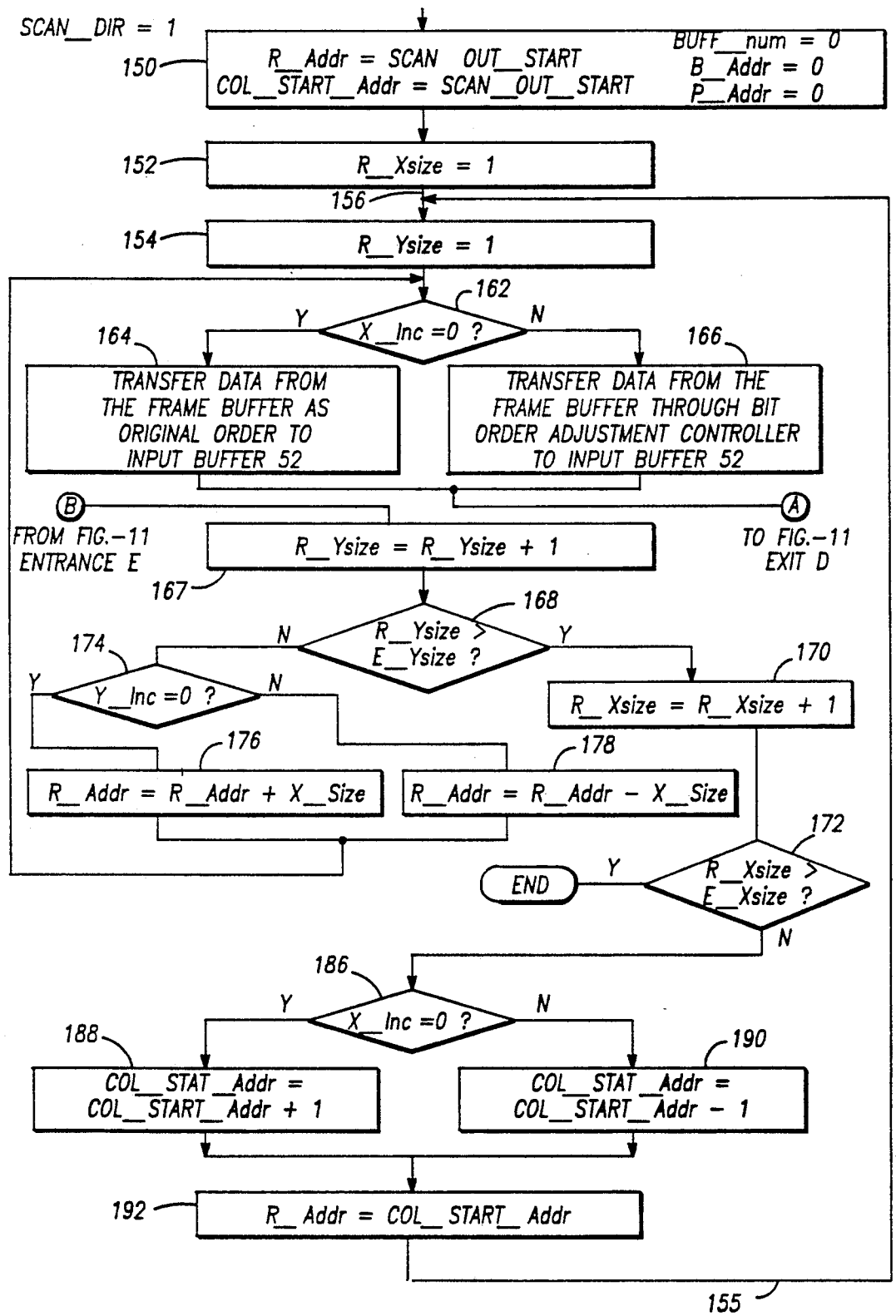

Referring to FIGS. 10-12, there is shown the flow chart of the scanning operation where the scan direction is perpendicular to the originally planned scan direction. Reference is now made to FIG. 10. In FIG. 10, there are two operation loops. The first loop is the path enclosed by lines 155 and 156. After scan out operation completes one circle around this loop, the value of the R_Xsize register increases by 1 in step 170, indicating a column has been scanned out. The second loop is the path enclosed by lines 157 and 158. After scan out operation completes one circle around this loop, the value of the R_Ysize register changes by an X_Size in step 176 or step 178, indicating a memory cell in a column has been scanned out. The second loop is nested within the first loop. In the step 150, the values of R_Addr register 84 and Col_Start_Addr register 96 (shown in FIG. 8) are both set equal to Scan_Out_Start Register 72 (shown in FIG. 8). Also, buffers 55 and 57 along with bit packing 56 are set to 0. In steps 152 and 154, R_Xsize register 86, R_Ysize register 88 (shown in FIG. 8) and are set equal to 1 respectively. R_Buff_num, B_Addr, and P_Addr are set to 0. Step 162 tests the value of X_Inc (shown in FIG. 8) to decide the scan sequence along the X dimension. If the value of the X_Inc is "0", in step 164, the bits in the frame buffer are transferred to input buffer 52 (shown in FIG. 7A) in their original bit order, because the scanning sequence in a line is from left to right. If X_Inc is "1", in step 166, the bits in the frame buffer are transferred to the input buffer 52 through bit order adjustment controller (shown in FIG. 7B), because the scanning sequence in each line is from right to left. After each byte is transferred from the frame buffer to the input buffer, the scan out operation will leave FIG. 10 to FIG. 11. FIG. 11 includes three functions, namely, 1) transferring one memory cell of bits from the input buffer to bit packing 56 (shown in FIG. 7A); 2) transferring the eight rows of bits from the bit packing to output buffer 55 or 57, when the bit packing is full or a column of memory cells have been scanned out; and 3) preparing to send the next column of bits to the output buffer when a column of memory cells have been scanned out. More details regarding these three functions will be explained in forthcoming paragraphs in reference of FIG. 11. It should be noted that the operation functions in FIG. 11 is nested within the second loop of FIG. 10. After completing one or more of the three functions, the scan out operation will go back to entrance E in FIG. 10.

After the bits in the input buffer has been transferred to the bit packing, step 167 increases the value of the R_Ysize register by 1. To decide whether a column has been scanned out, step 168 compares the value of the R_Ysize register with the value of E_Ysize register 69 (shown in FIG. 8). If the column has not been scanned out, step 174 further tests the value of Y_Inc register (shown in FIG. 8) to decide the scan sequence along the Y dimension. If the scan sequence in the Y dimension is from top to bottom (Y_Inc="0"), the value of the R_Addr register increases by X_size in step 176. If the scan direction in the Y dimension is from bottom to top (Y_Inc="1"), the value of the R_Addr register decreases by X_size in step 178. It should be appreciated that in step 176 or 178 the next address to be read out is the adjacent address in the same column, not in the same line. After the next address to be read out is obtained, the operation goes back to step 162 to start another circle of the second loop.

If step 168 determines that the column has been scanned out, step 170 increases the value of R_Xsize register 86 (as shown in FIG. 8) by 1. To determine whether all of the columns have been scanned out, step 172 compares the value of the R_Xsize register with that of E_Xsize register 69 (as shown in FIG. 8). If the value of the R_Xsize register is not greater than the value of the E_Xsize register, the subsequent steps will obtain the column start address (the value in the Col_Start_Addr register) for the next column. To determine the line scan sequence along the X dimension, step 186 tests the value of X_Inc. If the line scan sequence is from left to right (the value of X_Inc="0"), the value of Col_Start_Addr register 96 (shown in FIG. 8) increases by 1 in step 188; if the line scan sequence is from right to left (the value of X_Inc="1"), the value of the Col_Start_Addr register decreases by 1 in step 190. Step 192 sets the R_Addr register to the next column start address (the value in the Col_Start_Addr register). After the next column start address to be read out is obtained, the operation goes back to step 162 to start another circle of the first loop. If the value of the R_Xsize register is greater than the value of the E_Xsize register, meaning all of the column have been scanned out, step 172 terminates the scan out operation.

Reference is now made to FIG. 11. In FIG. 11, step 202 transmits eight bits in a byte from input buffer 52 to same bit position of the respective rows in bit packing 56. The bit position of bit packing 56 is indicated by the P_Addr register. After a byte of bits has been transferred to bit packing 56, step 204 increases the value of the P_Addr register by 1 to indicate next bit position of bit packing 56. To determine whether a column has been scanned out, step 206 compares the value of the R_Ysize register with that of the E_Ysize register. If the value of the R_Ysize register is not equal to that of the E_Ysize register, step 208 further determine whether bit packing 56 has been filled up by comparing the value of the P_Addr register with 7. If bit packing 56 has not been filled up, step 208 branches the operation to entrance E in FIG. 10 for getting another byte from the frame buffer to input buffer 52. If bit packing 56 has been filled up, step 210 transfers the data from bit packing 56 to the output buffer indicated by the Buff_num. The column position of the output buffer is indicated by B_Addr register. After the data has been transferred from bit packing 56 to the output buffer, step 212 increase the value of the B_Addr register by 1, indicating next column in the output buffer. To prepare to re-fill bit packing 56, the value of the P_Addr register and all the cells of bit packing 56 are set to 0 in step 214 and step 216 respectively. Through exit F, the scan operation goes to entrance E in FIG. 10 for re-filling bit packing 56.

If step 206 determines that the value of the R_Ysize register is equal to that of the E_Ysize register, meaning that a column has been scanned out, step 207 transfers the data from bit packing 56 to the output buffer indicated by the Buff_num. In preparing to start to fill the output buffer, step 209 sets the value of the B_Addr register to 0, indicating first column of the output buffer; and step 211 increases the value of the Buff_num by 1 (mod2) for alternately selecting output buffer #0 and output buffer #1. Before filling the newly selected output buffer, step 213 determines whether the output buffer is ready to receive new data by testing READY condition. Step 213 will constantly test READY condition until it the output buffer is ready to receive the new data. This step is necessary, because if the newly selected output buffer is still in the process of transmitting data to the raster device engine, the data in the newly selected output buffer will be destroyed by filling new data. An alternative approach is to provide an interrupt signal when the newly selected output buffer is ready to receive new data. To prepare to fill the newly selected output buffer, the value of the P_Addr register and all the cells of bit packing 56 are set to 0 in step 214 and step 216 respectively. Through exit F, the scan operation goes to entrance E in FIG. 10.

Referring to the illustrative drawings of FIG. 12, there is shown the details of steps 207 and 210 in FIG. 12. Step 222 sets the P_Addr register to 0 to indicate the first rows of the bit packing and the output buffer. Step 224 gets one byte from the P_Addr$^{th}$ row of the bit packing, and step 226 moves the byte to B_Addr$^{th}$ column of P_Addr$^{th}$ row of the output buffer. After the byte has been transferred from the bit packing to the output buffer, step 228 increases the value of the P_Addr register by 1, indicating the next rows of the bit packing and the output buffer. Step 230 determines whether all rows of the bit packing have been transferred to the output buffer by comparing the value of the P_Addr register with 7. If not all the rows of the bit packing have been transferred to the output buffer, step 230 branches the operation to step 224. If all the rows of the bit packing have been transferred to the output buffer, the operation terminates.

Even though the present invention is explained in reference to the hardware implementation, it is obvious to those skilled in the art that the invention can be implemented by using software.

In addition, the whole sequence of data transfer is synchronized with the timing given in FIG. 13. For example, scan line switching is synchronized with LSYNC signal.

While a particular embodiment of the invention has been described in detail, various modifications to the preferred embodiment may be readily apparent to those skilled in the art, and the generic principles defined herein may be applied to other embodiments and applications without departing from the spirit and scope of the invention. Thus, the scope of the invention is not intended to be limited to the embodiment described above, but is to be defined by the appended claims.

What is claimed is:

1. An apparatus for constructing a full page bit map for a raster device, said full page map having a plurality of bit positions, said full page bit map having an X dimension and a Y dimension, said bit positions consisting of a plurality of bit-lines that are parallel to said X dimension and a plurality of bit-columns that are parallel to said Y dimension, comprising:

a frame buffer means including a plurality of memory cells for storing said full page bit map, wherein said memory cells have a consecutive linear address sequence, wherein each of said memory cells has n bit positions, and wherein each of said bit-lines is stored in a section of said memory cells having consecutive linear addresses;

scan direction indicating means for indicating an X scan direction along said X dimension, and for indicating a Y scan direction along said Y dimension;

X dimension scan sequence indicating means for indicating first and second scan sequences along said X dimension;

Y dimension sequence indicating means for indicating first and second scan sequences along said Y dimension;

means for mapping said bit positions in said full page bit map into scan addresses in said frame buffer means, wherein said bit position mapping means maps said bit positions into said scan addresses based on said X and Y scan directions, and said first and second scan sequences along said X and Y dimensions; and means for scanning said full page bit map stored in said frame buffer means according to said scan addresses, such that said full page bit map is scanned out-line by bit-line in response to said X scan direction in a sequence indicated by said first and second scan sequences along said X and Y dimensions, and said full page bit map is scanned out bit-column by bit-column in response to said Y scan direction in a sequence indicated by said first and second scan sequences along said X and Y dimensions.

2. The apparatus of claim 1, wherein all bit positions in each of said memory cells has a predetermined bit order, wherein said bit-lines and bit-columns have a predetermined line order and a predetermined column order respectively, said bit position mapping means comprising:

frame buffer adjusting means for adjusting said bit order of each of said memory cells, said line order of said bit-lines, and said column order of bit-columns in response to said X and Y scan directions, and said first and second scan sequences along said X and Y dimensions.

3. The apparatus of claim 2, wherein said frame buffer adjusting means comprising:

means, coupled to said frame buffer means, for receiving data from said frame buffer means;

first adjusting means coupled to said receiving means, said first adjusting means including at least n lines with each of said n lines having at least n bit positions, wherein said n bit positions in one line of said first adjusting means contains n bits from n different memory cells in said frame buffer;

wherein said n lines have a descending line order and an ascending line order in response to said first and second scan sequences along said Y dimension respectively when said scan direction indicating means indicates said Y scan direction.

4. The apparatus of claim 3, wherein said first adjusting means further comprising:

adjusting buffer means coupled to first adjusting means, said adjusting buffer means including at least n lines with each line having a size of at least equal to said Y size, where a line in said buffer adjusting means contains bits in same bit positions from different memory cells.

5. The apparatus of claim 3, wherein said first adjusting means further comprising:

at least two adjusting buffer means, each of said at least two adjusting buffer means includes at least n lines with each line having a size of at least equal to said Y size, where a line in each of said at lest two adjusting means contains bits in same bit positions from different memory cells; and means for alternately activating said at least two adjusting buffer means.

6. The apparatus of claim 3, further comprising:

second adjusting means, coupled to said receiving means and said first adjusting means, for reversing said predetermined bit order of said memory cells in response to said second scan sequence along said X dimension.

7. The apparatus of claim 6, further comprising:

means for reversing said column order of said bit-columns in response to said second scan sequence along said X dimension.

8. The apparatus of claim 7, further comprising:

means for controlling data transmission from said frame buffer means to said raster device, wherein said controlling means directly transmits data received by receiving means to said raster device in response to said first scan sequence along said X dimension and said first scan sequence along said Y dimension when said scan direction indicating means indicates said X scan direction, wherein said controlling means first transmits data received by said receiving means to said first adjusting means, and then transmits data adjusted by said first adjusting means to said raster device in response to said first scan sequence along said X dimension when said scan direction indicating means indicates said Y scan direction, wherein said controlling means transmits data adjusted by said second adjusting means to said raster device in response to second scan direction along said X dimension when said scan direction indicating means indicates said X scan direction, and wherein said controlling means transmits said data adjusted by said second adjusting means to said first adjusting means, and then transmits data adjusted by said first adjusting means to said raster device in response to said second scan direction along said X dimension when said scan direction indicating means indicates said Y scan direction.

9. The apparatus of claim 6, wherein said X dimension represents a horizontal dimension;
said Y dimension represents a vertical dimension;
said first scan sequence along said X dimension represents a scan sequence from right to left;
said second scan sequence along said X dimension represents a scan sequence from left to right;
said first scan sequence along said Y dimension represents a scan sequence from top to bottom; and
said second scan sequence along said Y dimension represents a scan sequence from bottom to top.

10. The apparatus of claim 1, further comprising:

means for indicating scan boundaries within said full page bit map;

wherein said means for mapping said bit positions maps a portion of said bit positions located within said scan boundaries into corresponding addresses of said frame buffer means.

11. The apparatus of claim 10, wherein said means for indicating scan boundaries comprising:

first position indicating means for indicating current scan address in said frame buffer;

first size indicating means for indicating an X size representing total number of memory cells for storing each of said bit-lines;

second size indicating means for indicating a Y size representing total number of memory cells for storing each of said bit-columns;

third size indicating means for indicating an X scan size representing number of memory cells to be scanned out in each of said bit-lines;

fourth size indicating means for indicating a Y scan size representing number of cells to be scanned out in each of said bit-columns;

fifth size indicating means for indicating an X scanned size representing number of memory cells that has been scanned out in a bit-line;

sixth size indicating means for indicating a Y scanned size representing number of memory cells that has been scanned out in a bit-column;

means for updating said current scan address, and said X and Y scanned sizes based on said X and Y sizes; and means for indicating scan-ending addresses in said frame buffer means for said bit-line and bit-column, based on said current scan address, said X and Y scan sizes, and said X and Y scanned sizes.

12. The apparatus of claim 11, wherein said scan boundary indicating means further comprising:

second position indicating means for indicating start scan address in said frame buffer.

13. The apparatus of claim 1, further comprising:

means for providing operation status of said raster device; and wherein said scan direction indicating means indicates said X and Y scan directions in response to said operation status.

14. The apparatus of claim 1, further comprising:

a set of paper trays;

means for selecting said paper trays; and wherein said scan direction indicating means indicates said X and Y scan directions in response to selections of said paper trays by said paper tray selecting means.

15. A method for constructing a full page bit map stored in a frame buffer for storing a full page bit map, said full page bit map having a plurality of bit positions, said full page bit map having an X dimension and a Y dimension, said bit positions consisting of a plurality of bit lines that are parallel to said X dimension and a plurality of bit-columns that are parallel to said Y dimension, said frame buffer consisting of a plurality of memory cells having a consecutive linear consecutive address sequence, each of said memory cells having n bit positions, and each of said bit-lines being stored in a section of said memory cells having consecutive linear addresses, said method comprising the steps of:

indicating an X scan direction along said X dimension, and indicating a Y scan direction along said Y dimension;

indicating first and second scan sequences along said X dimension;

indicating first and scan sequences along said Y dimension;

mapping said bit positions into scan addresses in said frame buffer based on said X and Y scan directions, and said first and second scan sequences along said X and Y dimensions; and scanning said full page bit map stored in said frame buffer according to said scan addresses, such that said full page bit map is scanned out bit-line by bit-line in response to said X scan direction in a sequence indicated by said first and second scan sequences along said X and Y dimensions, and said full page bit map is scanned out bit-column by bit-column in response to said Y scan direction in a sequence indicated by said first and second scan sequences along said X and Y dimensions.

16. The method of claim 15, wherein all bit positions in each of said memory cells have a predetermined bit order, wherein said bit-lines and bit-columns have a predetermined line order and a predetermined column order respectively, said method further comprising the step of:

adjusting said bit order, said line order of said bit-lines and said column order of said bit-columns in response to said X and Y scan directions and first and second scan sequences along said X and Y dimensions.

17. The method of claim 16, wherein said frame buffer comprising first adjusting buffer means including at least n lines with each of said n lines having at least n bit positions, wherein said step of adjusting comprising the step of:

receiving data from said frame buffer; and adjusting received data by transmitting said received data in said first adjusting buffer means, wherein n bits from n different memory cells in said frame buffer are transmitted to said n bit positions in one line of said first adjusting buffer means, and arranging said n lines in a descending line order and an ascending line order in response to said first and second scan sequence along said X dimension respectively when said scan direction indicating means indicates said Y scan direction.

18. The method of claim 17 wherein said step of adjusting further comprising the step of:

transmitting data adjusted in said step of adjusting to second adjusting buffer means including at least n lines with each line having a size of at least equal to Y size, wherein bits in same bit positions from different memory cells in a column are transmitted to a same line in said second adjusting buffer means.

19. The method of claim 17, said step of adjusting comprising the step of:

reversing said bit order of said memory cells in response to said second scan sequence along said X dimension.

20. The method of claim 19, said step of adjusting further comprising the step of:

reversing said column order of said memory cell columns in response to said second scan sequence along said X dimension.

21. The method of claim 17, wherein:

said X dimension represents a horizontal dimension;
said Y dimension represents a vertical dimension;
said first scan sequence along said X dimension represents a scan sequence from right to left;
said second scan sequence along said X dimension represents a scan sequence from left to right;
said first scan sequence along said Y dimension represents a scan sequence from top to bottom; and
said second scan sequence along said Y dimension represents a scan sequence from bottom to top.

22. The method of claim 16, further comprising the step of:

providing operation status of said raster device; and
wherein said step of indicating indicates said X and Y scan directions in response to said step of providing operation status.

23. The method of claim 16, said method further comprising the step of:

selecting a set of paper trays; and
wherein said step of indicating indicates said X and Y scan directions in response to selections of said paper trays.

24. The method of claim 15, further comprising the step of:

indicating scan boundaries of said full page bit map;
wherein mapping said bit position maps a portion of said bit positions located within said scan boundaries into corresponding addresses of said frame buffer.

25. The method of claim 24, wherein said step of indicating scan boundaries further comprising the steps of:

indicating current scan address in said frame buffer;
indicating an X size representing total number of memory cells for storing each of said bit-lines;
indicating a Y size representing total number of memory cells for storing each of said bit-columns;
indicating an X scan size representing number of memory cells to be scanned out in each of said bit-lines;
indicating a Y scan size representing number of memory cells to be scanned out in each of said bit-columns;
indicating an X scanned size representing number of memory cells that has been scanned out in a bit-line;
indicating a Y scanned size representing number of memory cells that has been scanned out in a bit-column;
updating said current scan address, and X and Y scanned sizes based on said X and Y sizes; and
indicating scan-ending addresses in frame buffer for said bit-line and bit-column, based on said current scan address, said X and Y scan sizes, and said X and Y scanned sizes.

26. The method of claim 25, wherein said step of scan boundary indicating further comprising the step of:

indicating start scan address in said frame buffer.

* * * * *